Patented Dec. 11, 1934

1,984,023

UNITED STATES PATENT OFFICE 1,984,023

PROCESS FOR TREATING DISPERSIONS

Hyman Limburg, Amsterdam, Netherlands, assignor, by mesne assignments, to The Patent and Licensing Corporation, New York, N. Y., a corporation of Massachusetts No Drawing. Application February 20, 1929,
Serial No. 341,573

2 Claims. (Cl. 134—1)

The invention concerns a process for the preparation of emulsions, especially emulsions of asphalt, tar, paraffin, and the like, for use in road construction, for surface dressing of roads, as protective coating, as paints, etc.

As is known, emulsions of for instance, asphalt, for several uses, possess advantages over straight asphalt, one of the most important being the application of the material at ordinary temperature. The use of emulsions instead of asphalt as such is based on the fact that, after application in films of varying thicknesses, the dispersed particles coagulate or coalesce in a shorter or longer time, thereby forming a more or less closed layer of asphalt. Although not much is known about the factors causing the coalescence of the dispersed particles, it is likely that one of the most important factors is the evaporation of the dispersing phase, which is usually water, causing an increased concentration of the dispersed phase and of the other non-volatile substances present in the original dispersion, eventually resulting in a more or less complete coagulation of the dispersed particles.

It will be clear that a process whereby the coagulation of the asphalt particles is based on the evaporation of the water possess many drawbacks. In the first place the time necessary for the formation of a coagulated asphalt film will depend upon the weather, especially the humidity of the surrounding atmosphere. In the second place, the coagulation will in most cases be a slow one, especially with certain types of emulsifiers.

Attempts have been made to overcome these difficulties by using asphalt emulsions which contain only a small amount of stabilizing agent, as for instance, soap, such emulsions giving a relatively quick setting of the dispersed phase. As a result of the small amount of stabilizer, those emulsions are quite sensitive to all kinds of coagulating influences such as freezing, the addition of electrolytes, the addition of finely divided substances, etc. For that reason the use of these emulsions is limited, because in several instances it is required that the emulsion be stable against said coagulating influences as the emulsions often are exposed to severe atmospheric conditions during a long period, or, prior to application are mixed with mineral aggregates, etc. Further, these emulsions when used as a protective coating on cement, come in contact with calcium-ion-containing liquids and therefore, they should be stable against electrolytes, in order to prevent premature coagulation.

There are emulsions which are resistant against the various coagulating influences but they, on the other hand, show the drawback that they set very slowly and generally the film derived from those emulsions does not show the required impermeability and in many cases can be re-emulsified easily.

According to this invention, emulsions can be made which do not show the aforenamed drawbacks and which are resistant against various kinds of coagulating influences, such as freezing, storage, electrolytes, finely divided substances, but which, when coming in contact with the air, separate out the dispersed phase as a closed impermeable layer in a short time and in a form which can not be re-remulsified by the continued action of water.

Briefly, the invention consists in the addition to the emulsion or in the preparation of the emulsion in the presence of one or more substances which, when the emulsion is spread into a layer of greater or less thickness, and subjected to prolonged contact with the air, give rise to the formation of substances which can act as a coagulant for the emulsion.

The purpose of this invention can be achieved in various ways as will be clear from the following:

As known in general, for instance, the particles in an asphalt emulsion carry a negative charge with regard to the dispersing phase. Substances which can coagulate negatively charged emulsions, are in the first place, polyvalent positive ions, positively charged colloidal particles, and so on. In all these cases the coagulation is probably caused by the decrease in the electrical charge which occurs when the particles of opposite charge are incorporated in the emulsion. According to this invention, one or more substances which, when coming in contact with the air, yield in a more or less short time, polyvalent positive ions or positively charged particles, preferably of the colloidal order are combined with the emulsion before application. Examples of these substances are: alkali aluminate, alkali zincate, alkali plumbate, etc. All these substances can be added to an ordinary negatively charged emulsion in an alkaline medium, without causing coagulation. This may be explained by the fact that ions of the polyvalent metals present in these salts are combined with oxygen to a complex ion in which form they do not possess the coagulating influence which is inherent to the polyvalent metal ion itself. Other examples of substances which can be used for the purpose of my invention are the solutions of substances like copper hydroxide, zinc hydroxide, and the like, in ammonia. These substances, however, cannot be added to an emulsion containing, for instance, free sodium hydroxide, carbonate or the like, as in these cases the copper hydroxide is precipitated, which generally results in a coagulation of the emulsion. Hence, in this case, the foregoing difficulty can be avoided by using an emulsion containing ammonium hydroxide instead of sodium hydroxide. As the preparation of emulsions generally is more difficult when using ammonia than when using sodium hydroxide or the like, a special process has to be used for obtaining the emulsions of the desired composition. This special process may consist, for instance, in the dispersing of the non-aqueous phase into an aqueous solution of ammonia soaps with the help of a colloid mill.

Generally, the requirements which must be fulfilled by the emulsion, to which the substance, according to my invention, is to be added, can be classified in two groups:

1. The emulsion must be of such composition as to be stable against the addition of said substances, and 2. The emulsion must not contain electrolytes or other materials which may act upon the substance to be added in such a way as to change its chemical or physical properties and thus prevent the required action on the emulsion after application.

The action upon the applied emulsion of the above named substances will be clear. In the case of sodium aluminate the $CO_2$ which is always present in normal air, will react with sodium ions to form sodium carbonate, resulting in a separation of aluminum hydroxide. In a similar way the $CO_2$ will react upon solutions of sodium zincate, plumbate, and the like. When using solutions of copper hydroxide or the like in ammonia, the action is somewhat different. In these cases the ammonia will evaporate resulting in precipitation or deposition of the copper hydroxide which is, as known, only soluble in an aqueous solution containing a sufficient amount of ammonia.

Another way of carrying out the invention may be explained as follows: Several substances, such as albumins, basic dyestuffs, polyvalent metal hydroxides, and the like, possess an electrical charge which is dependent upon the hydrogen ion concentration of the medium. Thus, for instance, albumins are positively charged when the pH is lower than about 4.7, and similar conditions govern the charge of the other named materials. Probably in accordance therewith, the aqueous dispersions in which these substances are present possess electrical charges which show the same changes with varying pH as the said substances themselves. It is further known, that, generally speaking, the tendency to coagulate is the greater the smaller the electrical charge of the particles. Therefore, the object of my invention can be reached by using emulsions in which one or more of said substances are present in such a medium as to assure a sufficiently high charge of the particles, but which emulsions when coming in contact with air, alter their pH so as to diminish the electrical charge of the particles, or even make it nil. These results can be attained by establishing the required pH in the emulsion by the addition of a substance which on coming in contact with the air will evaporate or will react with $CO_2$ present in the air, resulting in an alteration of the pH of the emulsion in the direction of the pH corresponding with the iso-electric point of the added substance. In this way the electrical charge of the particles will be diminished gradually until finally the charge will become nil. It is obvious that this will result in more or less quick coagulation of the dispersed particles.

A further method of carrying out the invention may be explained as follows:

It is known that when substances of a hydrophobic character, such as finely divided carbon, are added to an emulsion, coagulation generally results. The character of substances like carbon can, however, be made more hydrophilic by the addition of suitable hydrophilic substances such as gelatin, tannin, saponin, soap and the like. In these cases, however, the hydrophilic character of the carbon remains unchanged by air. According to the invention hydrophobic substances are added to the emulsion in combination with a hydrophilic substance, the last named substance, however, being one which becomes partly or completely inactive when the emulsion comes in contact with air, and thus the hydrophilic character of the first named substance is restored. This purpose can be reached by applying substances like ammonium oleate, ammonium sulphonate, or the like, from which, when in contact with air, the ammonia evaporates leaving oleic acid, sulphonic acid or the like. The latter acids, when the original amount of soap is properly chosen, are no longer able, however, to impart a sufficiently hydrophilic character to the carbon. Therefore, after exposure to the air, the emulsion will contain a substance of hydrophobic character resulting in a coagulation of the emulsion.

The following examples may illustrate the invention:

1. Mexican asphalt of a melting point of about 40° C. (ball and ring) is mixed with .5% naphthenic acid and emulsified in an aqueous solution of sodium hydroxide containing a small excess over the amount required to neutralize the acids present in the asphalt. Thereupon, a small amount of, for instance, .5 to 2% of a stabilizer such as gelatin, casein, tanning, or the like, is added, and so much of a 10% solution of $Na_3AlO_3$ is added that, reckoned on asphalt, 0.01 to 2% of said substance is present in the final emulsion. When the emulsion so prepared is applied as a film, the sodium aluminate will be converted by contact with air, to sodium carbonate and aluminum hydroxide, which latter then serves to accelerate the coagulation and coalescence of the asphalt particles in the film.

2. Venezuelan asphalt is emulsified in an aqueous solution of ammonium sulphonates of a concentration of 0.5 to 2%, with the help of a colloid mill. When necessary the aqueous solution may contain a small excess of ammonia. Thereupon, so much of a 10% solution of copper hydroxide in ammonia is added that, reckoned on asphalt, 0.01 to 1% of copper hydroxide is present in the final emulsion. In this example, upon the evaporation of ammonia, copper hydroxide drops out of solution and acts to set or coagulate the emulsion film in a much less period of time than is normally required.

3. Mexican asphalt of a melting point of about 50° C., (ball and ring) is emulsified in an aqueous solution containing about .5 to 2% ammonium sulphonate and a small excess of ammonia. Thereupon 0.01 to .5% methylene blue is added, reckoned on finished emulsion. In this case, upon coming in contact with air, the ammonia evaporates, resulting in a decrease of the pH of the emulsion and a consequent decrease of the charge upon the particles sufficient to induce rapid coagulation and coalescence thereof.

4. Venezuelan asphalt of a melting point of about 40° C., (ball and ring) is emulsified with the help of a colloid mill, in an aqueous solution containing .5 to 2% ammonium naphthenate. A mixture of finely divided carbon with 5% ammonium naphthenate is prepared and so much of the mixture is added to the emulsion that, reckoned on asphalt, 2% carbon is present in the finished emulsion. According to this procedure, the ammonia of the ammonium naphthenate is eliminated shortly after coming in contact with air, thereby reducing the hydrophilic properties of the carbon and rendering it sufficiently hydrophobic to cause rapid coagulation and coalescence of the asphalt particles.

5. Mexican asphalt of a melting point of about 40° C. is emulsified in an aqueous suspension of clay, bentonite or the like and the resulting emulsion is combined with an amount of a 10% sodium aluminate solution sufficient to provide 0.01 to 2% sodium aluminate in the emulsion on the basis of the weight of asphalt contained therein. When the emulsion thus treated is applied as a layer or film over any surface to be treated therewith, the effect of the sodium aluminate will be substantially as described under Example 1.

I claim as my invention:

1. The step in a process for treating aqueous bituminous dispersions comprising adding to said dispersions an alkali salt of an amphoteric element.

2. The step in a process for treating aqueous bituminous dispersions comprising adding to said dispersions a salt of the group consisting of alkali aluminates, zincates and plumbates.

HYMAN LIMBURG.